(12) United States Patent
Bohling et al.

(10) Patent No.: US 9,777,183 B2
(45) Date of Patent: Oct. 3, 2017

(54) PROCESS FOR PREPARING POLYMER ENCAPSULATED TIO$_2$ PARTICLES

(71) Applicant: Rohm and Haas Company, Philadelphia, PA (US)

(72) Inventors: James C. Bohling, Lansdale, PA (US); David G. Kelly, Ambler, PA (US); Pu Luo, King Of Prussia, PA (US); Yogesh Tiwary, Bangalore (IN)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/156,390

(22) Filed: May 17, 2016

(65) Prior Publication Data

US 2016/0340539 A1 Nov. 24, 2016

Related U.S. Application Data

(60) Provisional application No. 62/163,641, filed on May 19, 2015.

(51) Int. Cl.
*C08F 220/18* (2006.01)
*C09D 133/08* (2006.01)
*C09C 1/36* (2006.01)
*C09D 4/00* (2006.01)

(52) U.S. Cl.
CPC .......... *C09D 133/08* (2013.01); *C08F 220/18* (2013.01); *C09C 1/3676* (2013.01); *C09D 4/00* (2013.01)

(58) Field of Classification Search
CPC ...... C09D 133/08; C09D 5/022; C09D 5/025; C09D 144/00
See application file for complete search history.

(56) References Cited

U.S. PATENT DOCUMENTS

| 9,234,084 B2 * | 1/2016 | Bardman | C09C 1/3676 |
| 9,371,466 B2 * | 6/2016 | Auld | C09C 1/3676 |
| 2010/0298483 A1 * | 11/2010 | Allen | B82Y 30/00 524/497 |
| 2014/0011943 A1 * | 1/2014 | Bardman | C09C 1/3676 524/521 |

FOREIGN PATENT DOCUMENTS

CA 2869161 A1 5/2015

* cited by examiner

*Primary Examiner* — Hannah Pak
(74) *Attorney, Agent, or Firm* — Reid S. Willis

(57) ABSTRACT

The present invention relates to a process for preparing an aqueous dispersion of polymer encapsulated TiO$_2$ particles, comprising a multistage polymerization steps that includes a relatively large amount of low T$_g$ first monomers and a relatively small amount of high T$_g$ second monomers that comprise a relatively high concentration of an acid monomer. The dispersion of encapsulated TiO$_2$ particles shows significantly improved freeze-thaw stability as compared with prior art processes that do not include staging with the second monomers described herein.

8 Claims, No Drawings

PROCESS FOR PREPARING POLYMER ENCAPSULATED TiO$_2$ PARTICLES

BACKGROUND OF THE INVENTION

The present invention relates to a process for preparing an aqueous dispersion of polymer encapsulated TiO$_2$ particles (TiO$_2$ composites), which are useful in plastics and coatings formulations.

Opacifying pigments such as TiO$_2$ provide opacity (hiding) for coatings and for plastics to conceal the undersurface. It is believed that the efficiency of the pigment is related to the spacing of the pigment particles in the coating or plastic Improvements in spacing can be achieved, for example, by using sulfur acid-functional polymers as dispersants for the pigments in combination with other polymers that at least partially encapsulate the pigment, as disclosed in US Pat. Pub. 2010/0298483. An improvement in the efficiency by which these TiO$_2$ composites can be prepared is disclosed in US Pat. Pub. 2014/0011943. Nevertheless, an ongoing concern with these composites is diminution of freeze-thaw stability. It would therefore be desirable to find a way to prepare a TiO$_2$ composite with improved freeze-thaw stability.

SUMMARY OF THE INVENTION

The present invention addresses a need in the art by providing a process for preparing an aqueous dispersion of polymer encapsulated TiO$_2$ particles comprising the steps of:
a) forming a mixture of i) an aqueous dispersion of TiO$_2$ particles and a sulfur acid functionalized polymer or a salt thereof; ii) an anionic surfactant; and iii) a redox initiator system; then
b) contacting the mixture in one or two stages with first monomers comprising i) methyl methacrylate, styrene, or a vinyl ester or a combination thereof and; ii) butyl acrylate, ethyl acrylate, 2-ethylhexyl acrylate, or 2-propylheptyl acrylate, or a combination thereof; then
c) polymerizing the first monomers in one stage or two sequential stages to form an aqueous dispersion of a first copolymer that encapsulates the TiO$_2$ particles; then
d) adding to the aqueous dispersion of step c) second monomers comprising i) from 0.01 to 5 weight percent, based on the weight of first and second monomers, of a carboxylic acid monomer; and ii) from 50 to 99.5 weight percent, based on the weight of the second monomers, of methyl methacrylate or styrene or a combination thereof;
e) polymerizing the second monomers to form an aqueous dispersion of copolymers encapsulating the TiO$_2$ particles;
wherein the first polymer has a calculated T$_g$ in the range of −30° C. to 30° C.;
wherein the second polymer has a calculated T$_g$ in the range of from 50° C. to 120° C.; and
the concentration of the second monomers is from 0.2 to 20 weight percent based on the weight of the first and the second monomers.

The process of the present invention forms TiO$_2$ composites with improved freeze-thaw stability in coatings applications.

DETAILED DESCRIPTION OF THE INVENTION

The present invention addresses a need in the art by providing a process for preparing an aqueous dispersion of polymer encapsulated TiO$_2$ particles comprising the steps of:
a) forming a mixture of i) an aqueous dispersion of TiO$_2$ particles and a sulfur acid functionalized polymer or a salt thereof; ii) an anionic surfactant; and iii) a redox initiator system; then
b) contacting the mixture in one or two stages with first monomers comprising i) methyl methacrylate, styrene, or a vinyl ester or a combination thereof and; ii) butyl acrylate, ethyl acrylate, 2-ethylhexyl acrylate, or 2-propylheptyl acrylate, or a combination thereof; then
c) polymerizing the first monomers in one stage or two sequential stages to form an aqueous dispersion of a first copolymer that encapsulates the TiO$_2$ particles; then
d) adding to the aqueous dispersion of step c) second monomers comprising i) from 0.01 to 5 weight percent, based on the weight of first and second monomers, of a carboxylic acid monomer; and ii) from 50 to 99.5 weight percent, based on the weight of the second monomers, of methyl methacrylate or styrene or a combination thereof;
e) polymerizing the second monomers to form an aqueous dispersion of copolymers encapsulating the TiO$_2$ particles; wherein
the first polymer has a calculated T$_g$ in the range of −30° C. to 30° C.;
the second polymer has a calculated T$_g$ in the range of from 50° C. to 120° C.; and
the concentration of the second monomers is from 0.2 to 20 weight percent based on the weight of the first and the second monomers.

In the first step of the process of the present invention, an aqueous dispersion of TiO$_2$ particles and a sulfur acid functionalized polymer or a salt thereof are mixed with an anionic surfactant and a redox initiator system. The sulfur acid functionalized polymer or salt thereof is prepared by polymerization of a sulfur acid monomer or a salt thereof or copolymerization with one or more other monomers, preferably copolymerization with an acrylate or a methacrylate momomer. Examples of suitable sulfur acid monomers include sulfoethyl acrylate, sulfoethyl methacrylate, sulfopropyl acrylate, sulfopropyl methacrylate, styrene sulfonic acid, vinyl sulfonic acid, 2-acrylamido-2-methyl propanesulfonic acid, and 2-methacrylamido-2-methyl propanesulfonic acid, and salts thereof, with 2-acrylamido-2-methyl propanesulfonic acid (AMPS) and sulfoethyl methacrylate being preferred.

The sulfur acid functionalized polymer or salt thereof may further comprise amine groups arising from the copolymerization of the sulfur acid monomer or salt thereof and an amine monomer, examples of which include dimethylaminoethyl methacrylate, dimethylaminoethyl acrylate, dimethylaminopropyl methacrylamide, dimethylaminopropyl acrylamide, t-butylaminoethyl methacrylate, and t-butylaminoethyl acrylate. The sulfur acid functionalized polymer or salt thereof may also comprise functional groups arising from the copolymerization of the sulfur acid monomer or salt thereof, and one or more water-soluble monomers such as hydroxyethyl acrylate, hydroxyethyl methacrylate, acrylamide, methacrylamide, acrylic acid, or methacrylic acid, or combinations thereof.

In one preferred embodiment, the sulfur acid functionalized polymer or salt thereof comprises acrylate or methacrylate groups or both, amine functional groups, and functional groups arising from a water-soluble monomer. Dimethylaminoethyl methacrylate (DMAEMA) is a preferred amine monomer.

The dispersion of TiO$_2$ and the sulfur acid functionalized polymer or salt thereof is advantageously prepared by slowly adding, with concomitant grinding, the aqueous dispersion of the TiO$_2$ to an aqueous dispersion of the polymer. The preferred solids content of the TiO$_2$/amphoteric polymer dispersion is in the range of 70 to 80 weight percent based on the weight of $TiO_2$, polymer, and water.

The $TiO_2$/polymer dispersion is added to a vessel and contacted with a) an anionic surfactant preferably mixed with water. Examples of suitable anionic surfactants include $C_4$-$C_{20}$ alkyllbenzene sulfonates such as dodecylbenzene sulfonate, polyoxyethylene $C_8$-$C_{20}$ ether phosphates such as tridecyl ether phosphate, and alkali metal $C_{10}$-$C_{20}$ α-olefin sulfonates such as $C_{14}$-$C_{16}$ α-olefin sulfonate.

The $TiO_2$/polymer dispersion may also be contacted with sodium styrene sulfonate, preferably a solution of sodium styrene sulfonate, more preferably as a 5 to 20 weight percent solution based on the weight of water and sodium styrene sulfonate. A redox initiator system is then contacted with this mixture to initiate polymerization. As used herein, the term "redox initiator system" refers to a combination of a reducing agent, an oxidizing agent, and a metal ion catalyst. Examples of suitable oxidizing agents include persulfates such as ammonium and alkali metal persulfates; hydroperoxides, such as t-butyl hydroperoxide and cumene hydroperoxide; peroxides such as benzoyl peroxide, caprylyl peroxide, and di-t-butyl peroxide; peresters such as t-butyl peracetate, t-butyl perphthalate, and t-butyl perbenzoate; percarbonates; and perphosphates; with t-butyl hydroperoxide being preferred.

Examples of suitable reducing agents include ascorbic acid, isoascorbic acid, malic acid, glycolic acid, oxalic acid, lactic acid, and thioglycolic acid; an alkali metal hydrosulfite such as sodium hydrosulfite; a hyposulfite such as potassium hyposulfite; or a metabisulfite such as potassium metabisulfite; and sodium formaldehyde sulfoxylate.

Suitable metal ion catalysts include halide, sulfate, and nitrate salts of cobalt, iron, nickel, and copper, used in small amounts. An example of a preferred redox initiator system is t-butyl hydroperoxide/isoascorbic acid/$Fe^{+2}$. Preferably, the metal ion catalyst is added prior to the addition of the oxidizing and reducing agents. It is further preferred that the oxidizing and reducing agents are added over time to maintain a relatively even level of radical flux over the course of the addition of monomers.

Preferably, the waiting period between the onset of addition of reducing agent and oxidizing agent of the redox initiator system and the first monomer is in the range of from 30 seconds to about 10 minutes, more preferably from 1 minute to 5 minutes.

In the step following the addition of redox initiator, first monomers are advantageously added as an aqueous dispersion with a surfactant, preferably sodium dodecylbenzene sulfonate or dodecyl allyl sulfosuccinate. The first monomers are preferably a combination of methyl methacrylate and butyl acrylate or 2-ethylhexyl acrylate or a combination thereof. Preferably, the $T_g$ of the copolymer prepared in the first step, as calculated by the Fox equation, is from −5° C. to 20° C.

The first monomers are contacted with the mixture of the aqueous dispersion of the $TiO_2$ particles, the sulfur acid functionalized polymer or salt thereof, the anionic surfactant, and the redox initiator system in a single stage or in two stages. When the monomer addition and polymerization is carried out over two stages, the composition of the first stage first monomers—concentrations as well as specific monomers chosen—may be the same as or different from the composition of the second stage first monomers. Preferably, the monomer compositions are different.

The first monomers may include one or more additional monomers such as carboxylic acid monomers examples of which include acrylic acid, methacrylic acid, and itaconic acid; multiethylenically unsaturated monomers, including divinyl benzene and allyl methacrylate; and sulfur acid monomers such as sodium styrene sulfonate and AMPS.

In a preferred embodiment of the method of the present invention, a first stage first monomer mixture comprising from 50 to 65 weight percent butyl acrylate, from 35 to 45 weight percent methyl methacrylate, and from 0.2 to 2 weight percent methacrylic acid is copolymerized to form a first stage first polymer. Then a second stage first monomer mixture comprising 35 to 45 weight percent styrene, 55 to 65 weight percent butyl acrylate, from 0.2 to 2 weight percent methacrylic acid or acrylic acid, and 0.1 to 1 weight percent sodium styrene sulfonate is copolymerized to form an aqueous dispersion of first copolymer that encapsulates the $TiO_2$ particles.

When the first monomers are copolymerized in two sequential stages the weight-to-weight ratio of monomers in the second stage to monomers in the first stage is preferably from 1:1, more preferably from 2:1, most preferably from 3:1, to 10:1, more preferably to 8:1, most preferably to 6:1.

In a subsequent step, second monomers comprising a carboxylic acid monomer and from 50 to 95 weight percent of methyl methacrylate or styrene or a vinyl ester or a combination thereof is added to the aqueous of the first copolymer encapsulated $TiO_2$ particles. Preferably, the second monomers comprise, based on the weight of the second monomers, from 0.5, more preferably from 1, and most preferably from 2 weight percent carboxylic acid monomer to 20, more preferably to 15, and most preferably to 10 weight percent carboxylic acid monomer. Preferably the second monomers comprise, based on the weight of the first and second monomers, from 0.05, more preferably from 0.2, and more preferably from 1 weight percent carboxylic acid monomer to 3, more preferably to 2 weight percent carboxylic acid monomer.

Preferably, the second monomers comprise from 60, more preferably from 70, to 95, more preferably to 90 weight percent methyl methacrylate or styrene or a combination thereof. The second monomers may further comprise other monomers, for example, up to 40 weight percent, preferably up to 20 weight percent butyl acrylate, 2-ethylhexyl acrylate, or 2-propylheptyl acrylate or a combination thereof.

Preferably, the concentration of the second monomers is from 0.5, more preferably from 1, to preferably 15, more preferably to 10 weight percent based on the weight of the first and the second monomers.

The second monomers are then polymerized to form the aqueous dispersion of copolymers encapsulating the $TiO_2$ particles. These copolymers are multiphasic with the first monomers forming a film-forming phase and the second monomers forming a hard, non-film-forming phase.

The composite of the present invention is useful in coating formulations and can be admixed with other materials such as dispersants, defoamers, surfactants, solvents, additional binders, thickeners, extenders, coalescents, biocides, and colorants. It has been surprisingly discovered that the addition and copolymerization of relatively small amounts of second monomers with a relatively high concentration of a carboxylic acid monomer results in a $TiO_2$ composite with exceptional freeze-thaw stability as compared with composites prepared without acid monomer in this final stage. In fact, it has been discovered that when acid monomer is used in the polymerization of the first monomer, the improvement in freeze-thaw stability of the subsequent coating formulation is substantially less.

EXAMPLES

In the following examples, the $TiO_2$ polymer composite slurry was prepared substantially as disclosed in US Pat. Pub. 2010/0298483, page 7, paragraph 0053.

Comparative Example 1

Preparation of Polymer Encapsulated $TiO_2$ with No Third Stage

Monomer Emulsion 1 (ME1) was prepared by mixing water (11.25 g), Polystep A-16-22 anionic surfactant (2.183 g), butyl acrylate (BA, 30.375 g), methacrylic acid (MAA, 0.502 g), and methyl methacrylate (MMA, 19.33 g).

Monomer Emulsion 2 (ME2) was prepared by mixing water (56.25 g), Polystep A-16-22 anionic surfactant (15.094 g), styrene (Sty, 104.152 g), MAA (2.671 g), BA (158.898 g), and sodium styrene sulfonate (1.335 g).

To a four-neck 2-L round bottom flask equipped with a mechanical paddle stirrer, a thermocouple, nitrogen inlet, and reflux condenser was added $TiO_2$ polymer composite slurry (365.83 g) and water (38 g). The mixture was heated to 30° C. under $N_2$; to the flask was sequentially added a premixed aqueous solution of Polystep A-16-22 anionic surfactant (2.7 g in 21 g water), a premixed aqueous solution of sodium styrene sulfonate (2.138 g in 20 g water), an aqueous solution of t-butyl hydrogen peroxide (0.428 g in 5 g water), an aqueous solution of isoascorbic acid (0.238 g in 5 g water), a mixture of an aqueous solution of iron sulfate heptahydrate (10.688 g, 0.15% iron), and an aqueous solution ethylene diamine tetraacetic acid (EDTA, 0.27 g, 1%). Cofeed catalyst (4.27 g t-butyl hydrogen peroxide in 50 g water) and cofeed activator (2.363 g isoascorbic acid in 50 g water) were fed to the flask at a rate of 0.4 g/min After 3 minutes, ME1 was fed to the reactor at a rate of 3.22 g/min and the flask temperature was allowed to exotherm to 50° C. After ME1 addition was complete, the monomer emulsion vessel was rinsed with 5 g deionized water, which was added to the flask. The cofeed catalyst and activator were continued for 3 min, then stopped, and the flask was held at 50° C. After 18 minutes, addition of the cofeed catalyst and activator was resumed at a rate of 0.4 g/min; 2 minutes after resumption, ME2 was fed to the reactor at a rate of 3.7 g/min, with the flask temperature being controlled at 68° C. After completion of ME2 addition, the monomer emulsion vessel was rinsed with 5 g deionized water, which was added to the flask. The cofeed catalyst and activator addition was continued until completion. After completion of all feeds, the flask was cooled to room temperature. When the flask temperature reached to 45° C., an aqueous solution of ACRYSOL™ ASE-60 (4.838 g in 9 g water) was added to the flask at a rate of 0.5 g/min, followed by the addition of a solution of 29% aqueous ammonium hydroxide (3.6 g) and water (9 g), at a rate of 0.84 g/min After the flask was cooled to room temperature, the contents were filtered to remove any gel. The filtered dispersion was found to have a solids content of 57.4% with a pH of 9.

Example 1

Preparation of Polymer Encapsulated $TiO_2$ with High $T_g$ Third Stage Containing Acid Monomer ME1 was prepared by mixing water (11.25 g), Polystep A-16-22 anionic surfactant (2.25 g), butyl acrylate (30.825), methacrylic acid (0.54 g), and methyl methacrylate (19.688 g).

ME2 was prepared by mixing water (56.25 g), Polystep A-16-22 anionic surfactant (15.075 g), styrene (99.675 g), methacrylic acid (2.475 g), butyl acrylate (153.225 g), and sodium styrene sulfonate (11.294 g).

Monomer Emulsion 3 (ME3) was prepared by mixing water (2.5 g), methyl methacrylate (6.563 g), methacrylic acid (0.938 g), and butyl acrylate (1.875 g).

To a four-neck 2-L round bottom flask equipped with a mechanical paddle stirrer, a thermocouple, nitrogen inlet, and reflux condenser was added $TiO_2$ polymer composite slurry (365.83 g) and water (38 g). The mixture was heated to 30° C. under $N_2$; to the flask was sequentially added a premixed aqueous solution of Polystep A-16-22 anionic surfactant (2.7 g in 21 g water), a premixed aqueous solution of sodium styrene sulfonate (2.138 g in 20 g water), an aqueous solution of t-butyl hydrogen peroxide (0.428 g in 5 g water), an aqueous solution of isoascorbic acid (0.238 g in 5 g water), a mixture of an aqueous solution of iron sulfate heptahydrate (10.688 g, 0.15% iron), and an aqueous solution ethylene diamine tetraacetic acid (EDTA, 0.27 g, 1%). Cofeed catalyst (4.27 g t-butyl hydrogen peroxide in 50 g water) and cofeed activator (2.363 g isoascorbic acid in 50 g water) were fed to the flask at a rate of 0.4 g/min After 3 minutes, ME1 was fed to the reactor at a rate of 3.22 g/min and the flask temperature was allowed to exotherm to 50° C. After ME1 addition was complete, the monomer emulsion vessel was rinsed with 5 g deionized water, which was added to the flask. The cofeed catalyst and activator were continued for 3 min, then stopped, and the flask was held at 50° C. After 18 minutes, addition of the cofeed catalyst and activator was resumed at a rate of 0.4 g/min; 2 minutes after resumption, ME2 was fed to the reactor at a rate of 3.7 g/min, with the flask temperature being controlled at 68° C. After completion of ME2 addition, the monomer emulsion vessel was rinsed with 5 g deionized water, which was added to the flask.

After the rinse, cofeed addition was stopped, whereupon ME3 was added to the flask, followed by addition of an aqueous solution of t-butylhydrogen peroxide (0.1 g in 1.25 g water) and an aqueous solution of isoascorbic acid (0.075 g in 1.25 g water). Cofeed addition was resumed and continued until completion. After completion of all feeds, the flask was cooled to room temperature. When the flask temperature reached to 45° C., an aqueous solution of ACRYSOL™ ASE-60 (4.838 g in 9 g water) was added to the flask at a rate of 0.5 g/min, followed by the addition of a solution of 29% aqueous ammonium hydroxide (3.6 g) and water (9 g), at a rate of 0.84 g/min After the flask was cooled to room temperature, the contents were filtered to remove any gel. The filtered dispersion was found to have a solids content of 58% with a pH of 9.

Examples 2-6 were prepared substantially as described for Example 1 except for differences in ME3 as a percent of total monomer (ME1+ME2+ME3) and ME3 monomer profile.

The composition of ME3 was as follows:
Examples 1-3—20 BA, 70 MMA, 10 MAA;
Example 4—90 MMA, 10 MAA
Example 5—17 BA, 80 MMA, and 3 MAA
Example 6—20 BA, 70 Sty, and 10 MAA Table 1 illustrates the formulation of the paints prepared from the examples. In this Table, NaPP refers to Calgon 322 New Sodium polyphosphate; Defoamer refers to Foamaster NXZ Defoamer; Dispersant refers to TAMOL™ 945 Dispersant; QP 30000 refers to CELLOSIZE™ QP 30000 HEC; Talc refers to Mistron 353 Talc; $CaCO_3$ refers to Omyacarb 2 $CaCO_3$; AMP-95 refers to AMP™-95 Amine; Defoamer refers to Byk-022 Defoamer; CF-10 refers to TRITON™ CF-10 Surfactant; Composite refers to polymer/$TiO_2$ Composite; CM-219EF refers to PRIMAL™ CM-219EF (50%) Copolymer Dispersion; OP refers to ROPAQUE™ Ultra E Opaque Polymer; RM-2020 refers to ACRYSOL™ RM-2020 Rheology Modifier. (TAMOL, CELLOSIZE, AMP, TRITON, PRIMAL, ROPAQUE, AND ACRYSOL are all Trademarks of The Dow Chemical Company or Its Affiliates.)

TABLE 1

Paint Formulation with Polymer Encapsulated TiO$_2$

| Ingredients (%) | C1 | 1 | 2 | 3 | 4 | 5 | 6 |
|---|---|---|---|---|---|---|---|
| Water | 5.65% | 5.65% | 5.65% | 5.65% | 5.65% | 5.65% | 5.65% |
| NaPP | 0.03% | 0.03% | 0.03% | 0.03% | 0.03% | 0.03% | 0.03% |
| Defoamer | 0.16% | 0.16% | 0.16% | 0.16% | 0.16% | 0.16% | 0.16% |
| Dispersant | 0.14% | 0.14% | 0.14% | 0.14% | 0.14% | 0.14% | 0.14% |
| Propylene Glycol | 4.00% | 4.00% | 4.00% | 4.00% | 4.00% | 4.00% | 4.00% |
| QP 30000 | 0.21% | 0.21% | 0.21% | 0.21% | 0.21% | 0.21% | 0.21% |
| Talc | 6.36% | 6.36% | 6.36% | 6.36% | 6.36% | 6.36% | 6.36% |
| Omyacarb 2 | 5.30% | 5.30% | 5.30% | 5.30% | 5.30% | 5.30% | 5.30% |
| AMP-95 | 0.05% | 0.05% | 0.05% | 0.05% | 0.05% | 0.05% | 0.05% |
| Defoamer | 0.11% | 0.11% | 0.11% | 0.11% | 0.11% | 0.11% | 0.11% |
| CF-10 | 0.19% | 0.19% | 0.19% | 0.19% | 0.19% | 0.19% | 0.19% |
| Grind Sub-Total | 22.19% | 22.19% | 22.19% | 22.19% | 22.19% | 22.19% | 22.19% |
| Composite | 62.08% | 61.43% | 61.91% | 61.75% | 61.30% | 62.75% | 61.65% |
| CM-219EF | 3.25% | 3.26% | 2.85% | 3.08% | 3.26% | 3.23% | 3.24% |
| Opaque Polymer | 9.62% | 9.62% | 9.62% | 9.62% | 9.62% | 9.62% | 9.62% |
| Butyl Carbitol | 1.22% | 1.22% | 1.22% | 1.22% | 1.22% | 1.22% | 1.22% |
| RM-2020 | 0.30% | 0.30% | 0.30% | 0.30% | 0.30% | 0.30% | 0.30% |
| AMP-95 | 0.09% | 0.09% | 0.09% | 0.09% | 0.09% | 0.09% | 0.09% |
| Water | 1.24% | 1.88% | 1.82% | 1.75% | 2.02% | 0.60% | 1.69% |
| Total | 100% | 100% | 100% | 100% | 100% | 100% | 100% |

Table 2 shows freeze-thaw stability for paints prepared using the polymer encapsulated TiO$_2$ samples. Freeze-thaw studies were carried out for 18 h at −15° C., followed by at least a 4-h thaw. % ME3 refers to the percent weight of ME3 of total monomers used to make the encapsulating polymer; KU$_o$ refers to the initial KU (in Krebs Units); KU$_{1d}$ refers to the KU after 1 day; KU$_{FT1}$ refers to the KU after the first freeze-thaw cycle; KU$_{FT2}$ refers to the KU after the second freeze-thaw cycle; and KU$_{FT3}$ refers to the KU after the third freeze-thaw cycle. The pH of all the samples was adjusted to between 8.8 and 8.9.

TABLE 2

Freeze-Thaw Stability for Polymer Encapsulated TiO$_2$ Samples

| | Ex | | | | | | |
|---|---|---|---|---|---|---|---|
| | C1 | 1 | 2 | 3 | 4 | 5 | 6 |
| % ME3 | 0 | 3 | 1 | 10 | 3 | 3 | 3 |
| Freeze-Thaw Stability | | | | | | | |
| KU$_o$ | 89.6 | 81.5 | 83.3 | 81.7 | 83 | 85.9 | 90.8 |
| KU$_{1d}$ | 89.6 | 80.4 | 84.5 | 84.3 | 83.5 | 86.4 | 91.6 |
| KU$_{FT1}$ | 106 | 81.5 | 88.2 | 83.5 | 82.7 | 86.7 | 91.6 |
| KU$_{FT2}$ | 130 | 83 | 92 | 85.1 | 85.6 | 88.7 | 92 |
| KU$_{FT3}$ | >140 | 83.2 | 95.5 | 88.6 | 85 | 91.5 | 93.7 |
| ΔKU | >50 | 2 | 12 | 7 | 2 | 6 | 3 |

It has been surprisingly discovered that a relatively large amount of acid monomer in a relatively small amount of a high T$_g$ ME3 gives excellent freeze-thaw stability over three cycles as compared to an encapsulating polymer that is prepared without this third stage. It has further been discovered that addition of significantly higher concentrations of the acid monomer in the second stage was required to give acceptable freeze-thaw stability without this third stage.

The invention claimed is:

1. A process for preparing an aqueous dispersion of polymer encapsulated TiO$_2$ particles comprising the steps of:
   a) forming a mixture of i) an aqueous dispersion of TiO$_2$ particles and a sulfur acid functionalized polymer or a salt thereof; ii) an anionic surfactant; and iii) a redox initiator system; then
   b) contacting the mixture in one or two stages with first monomers comprising i) methyl methacrylate, styrene, or a vinyl ester or a combination thereof and; ii) butyl acrylate, ethyl acrylate, 2-ethylhexyl acrylate, or 2-propylheptyl acrylate, or a combination thereof; then
   c) polymerizing the first monomers in one stage or two sequential stages to form an aqueous dispersion of a first copolymer that encapsulates the TiO$_2$ particles; then
   d) adding to the aqueous dispersion of step c) second monomers comprising i) from 0.01 to 5 weight percent, based on the weight of first and second monomers, of a carboxylic acid monomer; and ii) from 50 to 99.5 weight percent, based on the weight of the second monomers, of methyl methacrylate or styrene or a combination thereof;
   e) polymerizing the second monomers to form an aqueous dispersion of copolymers encapsulating the TiO$_2$ particles;
   wherein the first polymer has a calculated Tg in the range of −30° C. to 30° C.;
   the copolymers formed from the polymerized second monomers have a calculated Tg in the range of from 50° C. to 120° C.; and
   the concentration of the second monomers is from 0.2 to 20 weight percent based on the weight of the first and the second monomers.

2. The process of claim 1 wherein in step b) the mixture is contacted in two stages with first stage first monomers and second stage first monomers.

3. The process of claim 2 wherein the first stage first monomers comprises butyl acrylate and methyl methacrylate and the second stage first monomers comprise butyl acrylate and styrene.

4. The process of claim 2 wherein the first stage first monomers comprise from 50 to 65 weight percent butyl acrylate, from 35 to 45 weight percent methyl methacrylate, and from 0.2 to 2 weight percent methacrylic acid; and the second stage first monomers comprise 35 to 45 weight percent styrene, 55 to 65 weight percent butyl acrylate, from 0.2 to 2 weight percent methacrylic acid or acrylic acid, and 0.1 to 1 weight percent sodium styrene sulfonate, wherein the calculated $T_g$ of the first copolymer is from −5° C. to 20° C.

5. The process of claim 4 wherein the second monomers comprise from 0.5 to 20 weight percent of the carboxylic acid monomer, based on the weight of the second monomers; and wherein the concentration of the second monomers is from 0.5 to 15 weight percent, based on the weight of the first and the second monomers.

6. The process of claim 5 wherein the second monomers comprise, based on the weight of the second monomers: i) from 1 to 15 weight percent of the carboxylic acid monomer; and ii) 60 to 95 weight percent methyl methacrylate or styrene or a combination thereof; and wherein the concentration of the second monomers is from 2 to 10 weight percent, based on the weight of the first and the second monomers.

7. The process of claim 2 wherein the weight-to-weight ratio of second stage first monomers to first stage first monomers is from 1:1 to 10:1.

8. The process of claim 1 wherein in step b), the mixture is contacted in one stage with first monomers comprising methyl methacrylate or styrene or a combination thereof; and butyl acrylate.

\* \* \* \* \*